Oct. 6, 1959 H. LOCKER 2,907,575
VERTICALLY ADJUSTABLE TORSION WHEEL SUSPENSION
FOR TRAILERS AND THE LIKE
Filed Feb. 27, 1958 4 Sheets-Sheet 3
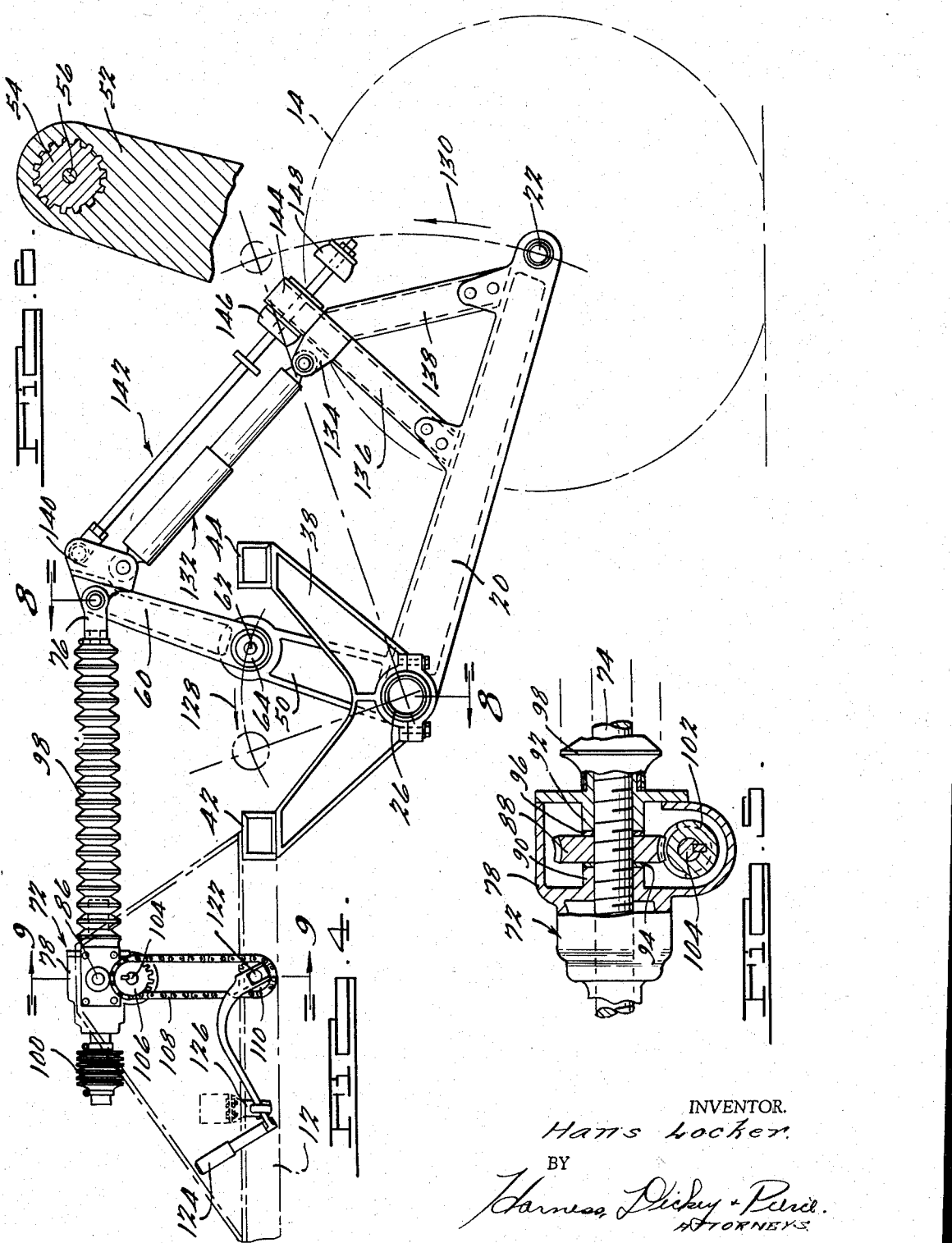
INVENTOR.
Hans Locker.
BY
Harness, Dickey & Pierce.
ATTORNEYS

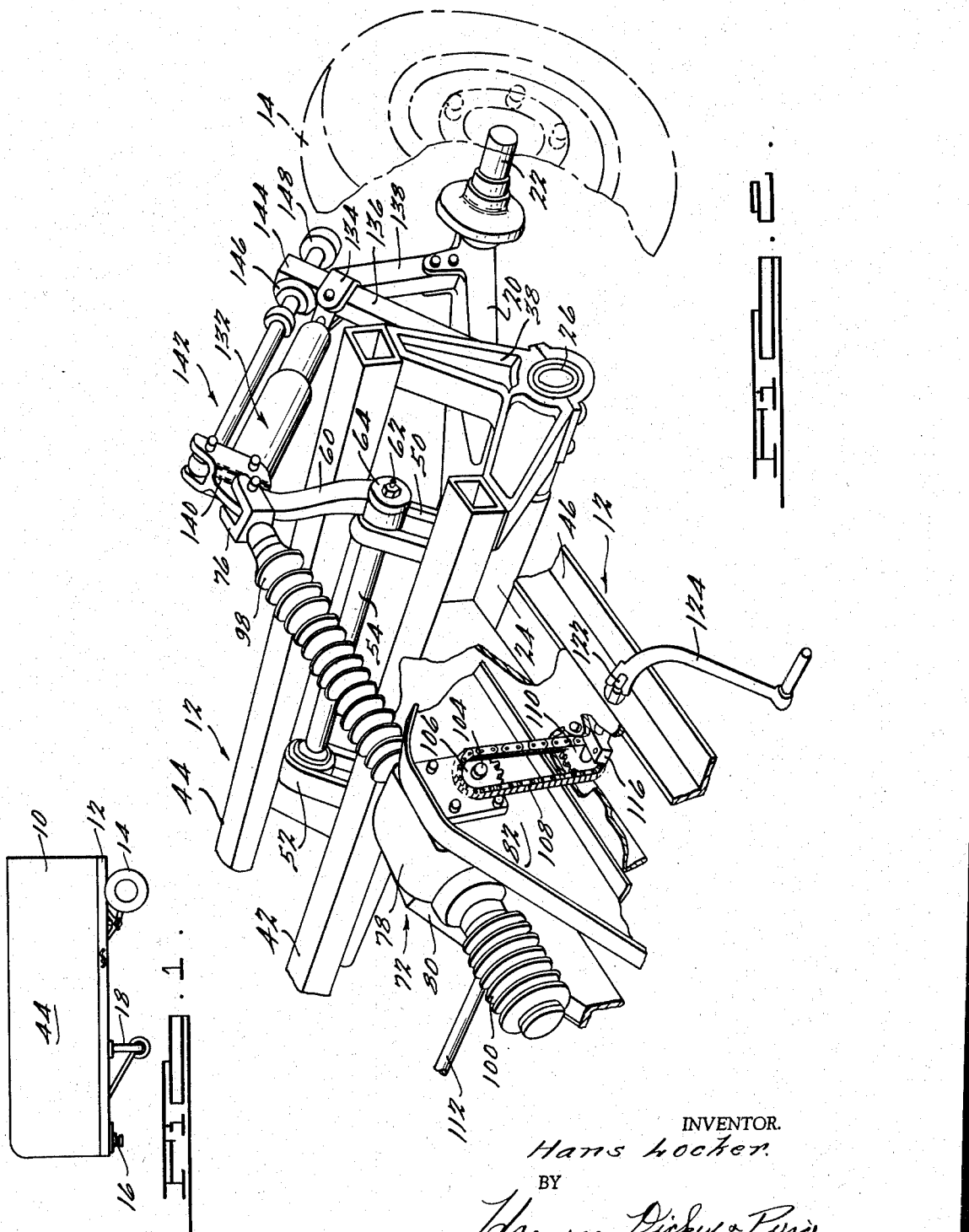

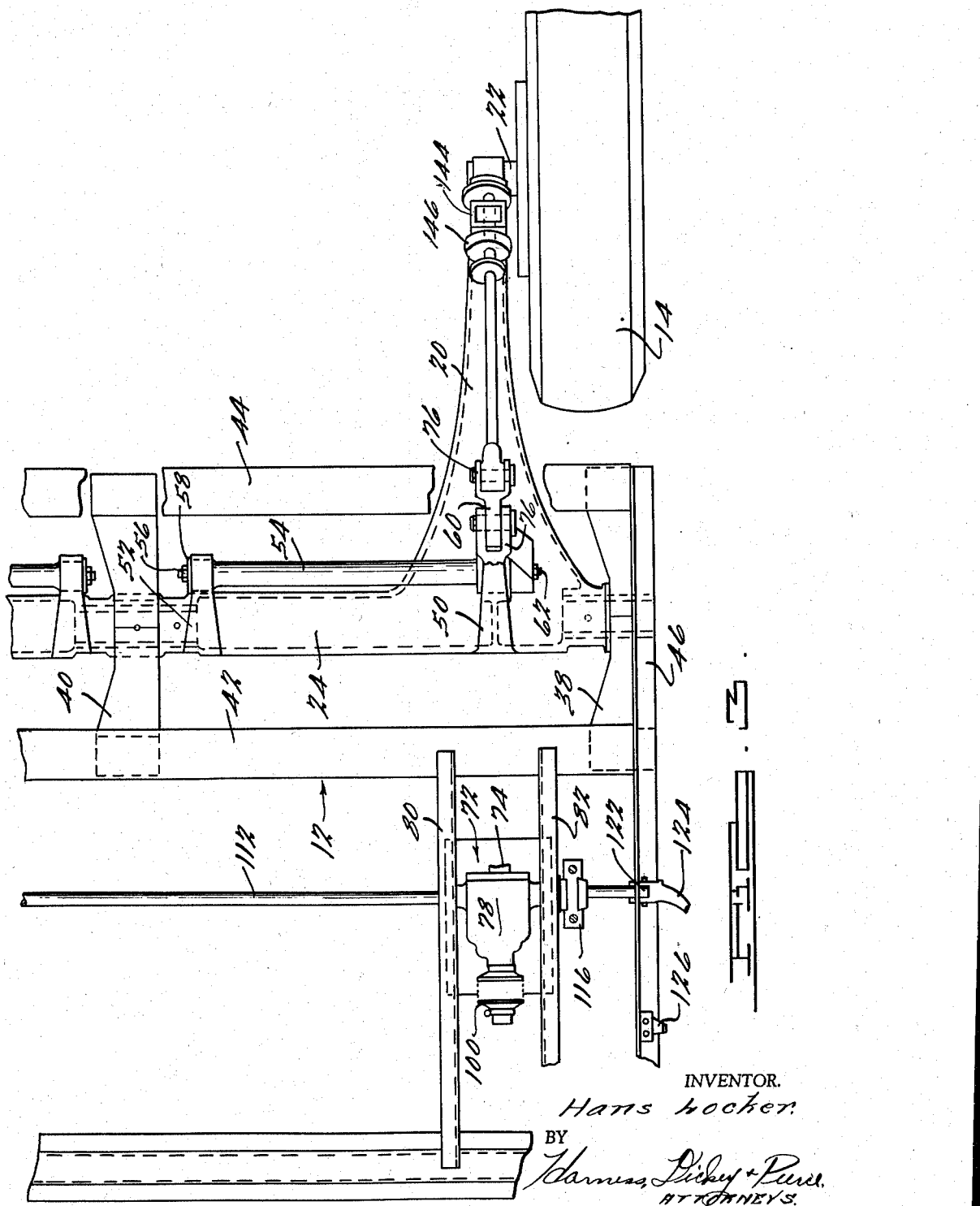

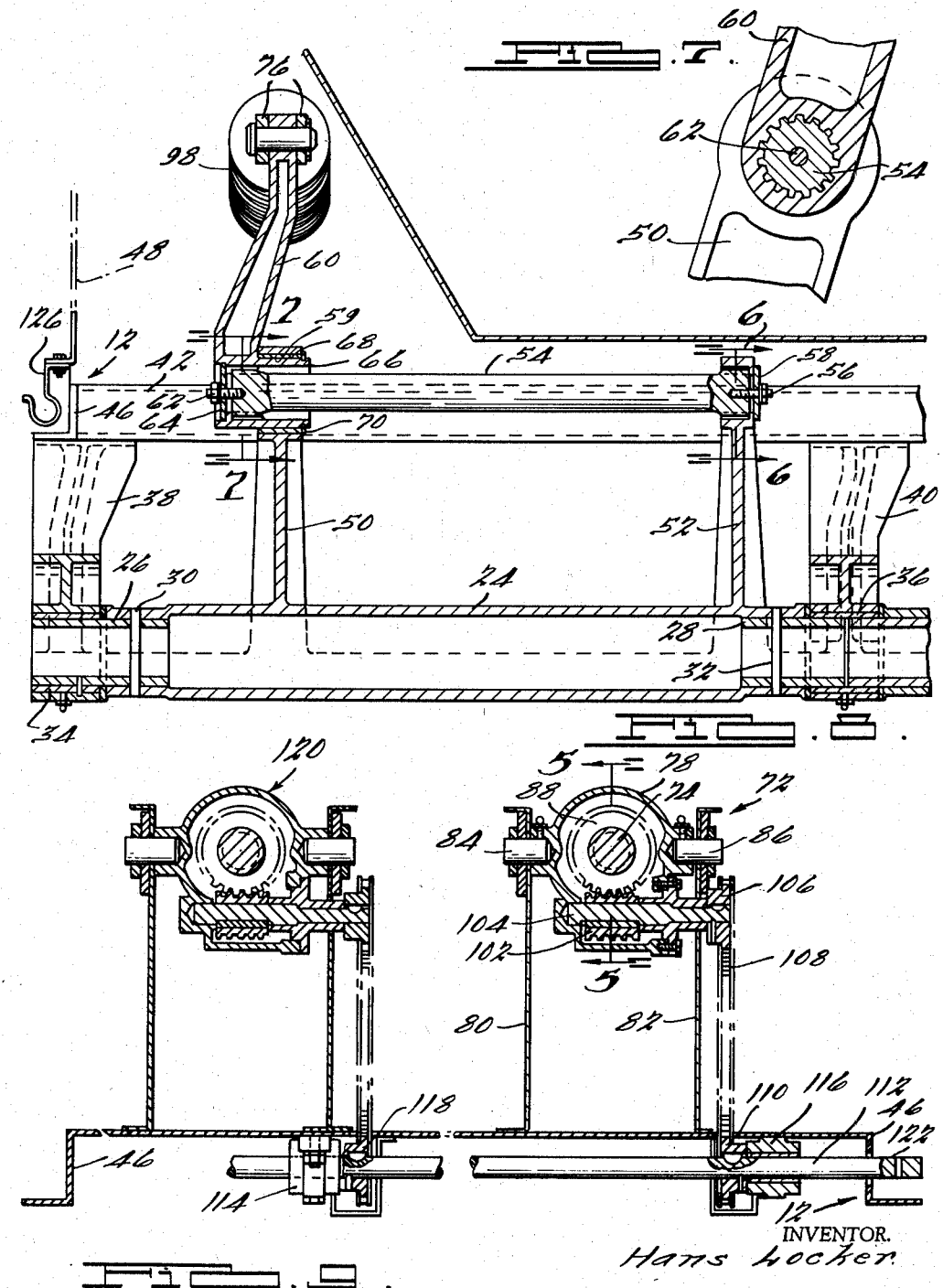

United States Patent Office

2,907,575
Patented Oct. 6, 1959

2,907,575

VERTICALLY ADJUSTABLE TORSION WHEEL SUSPENSION FOR TRAILERS AND THE LIKE

Hans Locker, Utica, Mich., assignor to Fruehauf Trailer Company, Detroit, Mich., a corporation of Michigan Application February 27, 1958, Serial No. 718,022

5 Claims. (Cl. 280—43.20)

This invention relates to new and useful improvements in torsion wheel suspensions for vehicles such as trailers and the like.

It is sometimes necessary to haul by truck mechanisms so delicate that they are damaged by road shocks and jars transmitted through a conventional spring suspension; and it is a primary object of this invention to provide a novel torsion suspension particularly adapted and pre-eminently suited for large highway trailers that will assure the necessary soft ride required for mechanisms of the type described.

In addition to the above, it is necessary on occasions to vary the over-all height of a trailer. For example, it sometimes is desirable to ship a loaded trailer by air freight; and, in order to get the trailer into a conventional freight handling aircraft, it is necessary to reduce the usual height of the trailer by approximately two feet. This cannot be done if the trailer body is supported by a standard spring suspension. It is not feasible simply to reduce the size of the trailer body. The primary use would still be over the highway operation and the reduction in size materially decreases the pay load capacity of the trailer. This in turn increases the cost per pound of pay load to such an extent that the smaller trailer is not competitive with a standard unit in ordinary operation. The maximum height of trailers is limited by law and by standard bridge and tunnel clearances, and it is desirable to maintain the maximum permissible height not only to provide as much pay load capacity as possible for the trailer but also to assure adequate clearance between the trailer body and the running gear. In this latter connection it will be readily apparent that some vertical movement of the trailer body relative to the running gear occurs constantly in normal operation, and this movement is particularly pronounced under the circumstances of this invention where it is desired that the suspension provides an essentially soft ride for the trailer body. In view of the foregoing, another important object of this invention is to provide a wheel suspension for trailers and the like that holds the trailer body at standard height with maximum clearance between the body and the running gear and that is adjustable to lower the body on the running gear in special situations as for example, when it is desired to ship the trailer by air freight or when the trailer encounters a lower than usual overhead clearance in a tunnel or bridge.

Other objects and advantages of the invention will be apparent during the course of the following description.

In the drawings forming a part of this specification and wherein like numerals are employed to designate like parts throughout the same, Figure 1 is a side view of a trailer equipped with a torsion spring suspension embodying the invention, Fig. 2 is a fragmentary perspective view illustrating the manner in which each wheel of the trailer is individually sprung by the suspension of this invention, parts thereof being broken away to more clearly illustrate hidden parts of the suspension, Fig. 3 is a fragmentary top plan view thereof, Fig. 4 is a side elevational view of the same, Fig. 5 is a fragmentary vertical sectional view taken on the line 5—5 of Fig. 9 and showing a part of the mechanism for adjusting the trailer body vertically relative to the running gear, Fig. 6 is a fragmentary vertical sectional view taken on the line 6—6 of Fig. 8 and showing a part of the mounting for the torsion rod, Fig. 7 is a fragmentary vertical sectional view taken on the line 7—7 of Fig. 8 and showing another part of the mounting for the torsion rod, Fig. 8 is a fragmentary vertical sectional view taken on the line 8—8 of Fig. 4, and Fig. 9 is an enlarged vertical sectional view taken on the line 9—9 of Fig. 4.

As suggested, the suspension of this invention provides a separate mounting for each wheel of the trailer; and, inasmuch as each individual mounting or suspension is identical only one is here shown and described in complete detail. In order to keep the specification as simple as possible commensurate with a complete disclosure, the suspension is here shown in a trailer having a single right hand wheel and a single left hand wheel at the rear of the trailer body. It will be readily apparent to those skilled in the art, however, that the suspension of this invention can be readily adapted to trailers having dual or tandem wheels or other wheel arrangements conventional in the art.

Considered in certain of its broader aspects the suspension of this invention comprises a rock shaft carried by and disposed transversely of the vehicle body forwardly of the rear wheel position. A wheel arm on the rock shaft extends rearwardly and downwardly and the trailing end thereof carries an axle which rotatably mounts the road wheel. Thus, the wheel arm trails behind the rock shaft as the trailer moves forwardly in normal operation to provide a generally caster-like mounting for the wheel. A pair of spaced apart, upstanding rocker arms are provided on the rock shaft at the pivoted end of the wheel arm, and a torsion rod is carried by the rocker arms. One of the rocker arms is fixed to the torsion rod and the other rocker arm merely supports the rod for turning movement or torsional deflection. A radially extending torsion arm is fixed to the torsion rod adjacent the last mentioned rocker arm, and adjustable means carried by the trailer body and connected to the distal end of the torsion arm holds the latter normally stationary.

Manifestly, the weight of the trailer body is transferred to the ground wheel through the rock shaft and the wheel arm and any tendency for the trailer body to settle down on the wheel is resisted by the torsion rod. Thus the torsion rod is always wound up or loaded by the weight of the trailer body and any load that may be contained therein. However, a condition of equilibrium normally obtains which holds the trailer body spaced sufficiently above the wheel to accommodate the usual vertical movement of the wheel under the body in operation of the vehicle. Actuation of the adjustable means connecting the torsion arm to the body turns the loaded torsion rod angularly so as to vary the spacing between the body and the wheel. In this manner the trailer body can be spaced properly above the road wheel for normal operation or dropped down onto or relatively close to the wheel for special situations such as shipment by airplane or lower than usual bridge or tunnel clearances. This particular mechanical arrangement permits the entire suspension to be contained within the standard eight foot width dimension of the trailer. No part of the susepnsion or the operating or adjusting mechanism projects outside this dimension.

The particular lever arrangement employed permits the adjusting mechanism to be positioned in-line or substantially in-line with the wheel arm. This, in turn, permits optimum distribution of load on the bearings of each suspension and distributes the total load uniformly on the complete suspension. Finally, the particular lever arrangement of this suspension permits a relatively large vertical adjustment of the trailer body to provide maximum versatility in operation.

For a detailed description of the invention, attention is first directed to Figure 1 which shows a trailer body 10 having the usual base or floor frame structure 12. Ground engaging wheels 14 are provided at the rear of the body 10 and the usual kingpin connection 16 is provided at the forward end thereof. A conventional prop or landing gear 18 is provided under the trailer body 10 behind the kingpin 16 to support the trailer when detached from the tractor (not shown).

Only one wheel 14 is here shown, but it will be readily appreciated that a wheel is provided at each side of the trailer. Only a single wheel is shown but if desired, conventional dual wheels can be provided on each axle. Also, while only one wheel 14 is shown at each side of the trailer it will be readily apparent that the suspension can be adapted to a tandem wheel arrangement simply by providing identical suspensions one behind the other at each side of the trailer.

As perhaps best shown in Figure 2, each suspension comprises a wheel arm 20 extending longitudinally of the trailer body 10 and to one side thereof. An axle 22 carried by the arm 20 at the rearward or trailing end thereof rotatably mounts the wheel 14 in a conventional manner, and the forward end of the arm is formed to provide a transverse tubular rock shaft 24. Tube journals 26 and 28 fit snugly in the open ends of the rock shaft 24 and are secured thereto by pins 30 and 32. As perhaps best shown in Fig. 8, the tube journals 26 and 28 extend from the ends of the rock shaft 24 and the projecting portions thereof are received in and supported by bearings 34 and 36 carried by V-shaped mounting brackets 38 and 40 welded or otherwise secured to transverse members 42 and 44 of the frame 12. The mounting bracket 38 preferably is located at the extreme outer edge of the frame 12 under the longitudinal side frame member 46 and under the side wall 48 of the trailer body 10 for maximum strength, and the mounting bracket 40 preferably is disposed on the center line of the trailer so that it forms a common support for both the right hand and the left hand wheel suspensions (Fig. 8).

From the foregoing it will be apparent that the journals 26 and 28 are in effect part of the rock shaft 24 and are free to turn in the bearings 34 and 36. Thus, the arm 20 is free to swing within limits with the rock shaft 24 to accommodate vertical movement of the wheel 14 under normal operating and travelling conditions.

A pair of rocker arms 50 and 52 are formed integrally on the rock shaft 24, as shown in Fig. 8. The rocker arms 50 and 52 are at opposite ends of the rock shaft 24, and they extend parallel to each other and generally at right angles to the wheel arm 20. Thus, the rocker arms 50 and 52 and the wheel arm 20 together with the rock shaft 24 and its journals 26 and 28, in effect, form a compound bell crank lever. As the wheel arm 20 swings vertically in operation the rocker arms 50 and 52 rock back and forth in unison.

A torsion rod 54 extends between and is carried by the rocker arms 50 and 52. The right hand end of the torsion rod 54, as viewed in Fig. 8, is splined to the rocker arm 52 and is connected to the arm by a screw 56 and thrust washer 58. The left hand end of the torsion rod 54, as viewed in Fig. 8, extends through an opening 59 in the rocker arm 50, and a torsion arm 60 is splined on the portion thereof which projects beyond the rocker arm. Screw 62 and thrust washer 64 hold the arm 60 securely on the torsion rod 54. A hub 66 on the inner side of the torsion arm 60 extends through the opening 59 and is snugly received and supported for rotation by a sleeve bearing 68 retained in the opening by a snap ring 70. As perhaps best shown in Fig. 4, the torsion arm 60 normally extends upwardly from the torsion rod 54 substantially parallel to the rocker arms 50 and 52. Thus, the torsion rod 54 is swung bodily back and forth by the rocker arms 50 and 52 as the wheel arm 20 swings in normal operation as hereinabove described.

The upper end of the torsion arm 60 is restrained and positioned by an adjusting mechanism 72. The mechanism 72 here shown comprises an externally screw threaded shaft 74 which is connected at one end by a clevis 76 to the upper end of torsion arm 60. The shaft 74 extends through a housing 78 disposed between parallel upright supports 80 and 82. Pivot journals 84 and 86 connect the housing 78 to the supports 80 and 82. A worm gear 88 threaded on the shaft 74 within the housing 78 is confined between internal embossments 90 and 92, as shown in Fig. 5, which permit the gear to rotate but prevent it from moving longitudinally on the shaft. Anti-friction washers 94 and 96 interposed between the worm gear 88 and the embossments 90 and 92 assure relatively free rotation of the gear. Bellows covers 98 and 100 enclosing the shaft 74 at opposite sides of the housing 78 keep the shaft clean and free of dirt and the like.

A worm 102 is keyed or otherwise secured to a stub shaft 104 which is journaled in the housing 78 below the worm gear 88. As shown in Fig. 9, the worm 102 meshes with the worm gear 88 so that rotation of the worm imparts a corresponding rotation to the worm gear and to the shaft 74. As shown in Fig. 9 the stub shaft 104 extends exteriorly of the housing 78 and the projecting end thereof carries a driven sprocket 106. The latter is connected by a chain 108 to a driving sprocket 110 on a jack shaft 112 which extends transversely of the floor frame structure 12 and is supported for rotation by bearing blocks 114 and 116 suitably fastened to the structure.

As shown in Fig. 9, a second driving sprocket 118 is keyed or otherwise secured to the jack shaft 112 adjacent the bearing block 114 and the sprocket 118 is operatively associated with a second adjusting mechanism 120 which is identical in construction and operation to the mechanism 72 and is operatively associated with a torsion suspension (not shown) on the other side of the trailer and identical to the one hereinabove described.

One end 122 of the jack shaft 112 extends laterally of the floor frame structure 12 through the longitudinal side frame member 46 and the projecting end thereof is pivotally connected to a crank handle 124. When the latter is operatively disposed as shown in Fig. 2, it is manually readily accessible to rotate the jack shaft 112 and simultaneously drive the sprockets 110 and 118. When not in use, the crank 124 is pivoted to an unobstructive position as shown in Fig. 4 and engaged with a retaining hook 126 on the side of the trailer body (Figs. 4 and 8).

When the jack shaft 112 is rotated it acts through the worm gear drive of the adjusting mechanism 72 to move the screw 74 either to the right or to the left, as viewed in Fig. 4, depending upon the direction of rotation of the jack shaft to either raise or lower the trailer body relative to the wheel 14. Manifestly, an identical action occurs through the adjusting mechanism 120 so that both sides of the trailer body are raised or lowered simultaneously and uniformly.

The action occurring in the vehicle suspension is now described in detail with reference to the particular wheel suspension here shown, but while no reference will be made specifically thereto, it will be readily understood that the same action is taking place in the corresponding wheel suspension on the other side of the vehicle. As suggested, the weight of the trailer body and any load that may be contained therein is transferred to the road wheel 14 through the mounting brackets 38 and 40, the wheel arm 20 and the axle 22. The weight of the trailer body of course pushes down on the rock shaft 24 and tends to turn the wheel arm 20 counterclockwise as viewed in Fig. 6 about the axle 22. This tends to swing the rocker arms 50 and 52 to the left as viewed in Fig. 6. Such swinging movement of the rocker arms 50 and 52, however, is resisted by the torsion rod 54 as the rocker arm 52 tends to twist or torsionally deflect the rod in one direction and the torsion arm 60 tends to twist or torsionally deflect the rod in the opposite direction. This is necessarily so as the rocker arm 52 swings to the left under the weight of the trailer body and the upper end of the torsion arm 60 is held stationary by the screw shaft 74 of the adjusting mechanism 72.

Eventually the full weight of the trailer body is taken by the torsion rods of the suspension assemblies and a condition of equilibrium obtains. Thereafter, additional loads and impacts transmitted to the suspensions in use due to bouncing of the body or to vertical movement of the wheels 14 as they traverse uneven conditions in the road surface are absorbed by the torsion rods of the individual suspensions. Each road wheel moves independently of the other to absorb road shocks, and shocks imparted to one wheel are not transmitted directly to the other wheel. In each instance, upward movement of a road wheel caused by the wheel striking a bump in the road surface for example, will tend to further "wind up" the torsion rod associated therewith, and as the wheel returns to its normal position the torsion rod will "unwind" and return to its normal torsionally stressed condition.

From the foregoing it will be readily apparent that if the adjusting mechanisms 72 and 120 are operated to move the actuating screws 74 thereof to the right as viewed in Fig. 6, the torsion arm 60 of each suspension will be swung angularly to the right or in a clockwise direction about the torsion rod 54 of the suspension and this movement of the torsion arm will wind up or additionally torsionally deflect the torsion rod. As a result the trailer body 10 will be lifted to increase the height of the trailer and to increase the spacing between the trailer body and the ground wheels 14.

Conversely, if the adjusting mechanisms 72 and 120 are operated to move the actuating screws 74 thereof to the left as viewed in Fig. 6, the torsion arm 60 of each suspension will be swung to the left or counterclockwise as viewed in Fig. 6 to unwind the torsion rod 54 of the suspension. The net result of this action is to reduce the height of the trailer and to decrease the relative spacing between the trailer body 10 and the road wheels 14.

In Fig. 6, the adjusting mechanism 72 is shown with the operating screw 74 at the right hand limit of its travel to raise the trailer body 10 a maximum distance from the ground wheels 14.

From the drawing it will be apparent that as the adjusting mechanism 72 is operated to move the actuating screw 74 to the left the rocker arms 50 and 52 will swing to the left as indicated at 128 and the wheel arm 120 will move angularly as indicated at 130. Manifestly, as the rocker arms 50 and 52 and wheel arm 20 move angularly as indicated above the body 10 will be lowered onto or in the direction of the wheels 14.

It is significant that the function or operation of the wheel suspensions is in no way affected by vertical adjustment of the body 10 relative to the wheels 14. The same load is imposed on the torsion rods 54 in all adjusted positions of the trailer body 10. The only difference is the relative spacing between the body 10 and the wheels 14.

In normal operation, it is desirable to have relatively great spacing between the trailer body 10 and the wheels 14. This is particularly true if the torsion rods 54 are such as to provide a soft ride. If desirable, the trailer body 10 can be raised to a maximum height permitted by the laws of the state in which the trailer is operating. However, if a special condition is met, as for example a load having a high center of gravity, or a lower than normal overhead clearance in a bridge or tunnel, or if it is desired to transport a loaded trailer by air freight, the body 10 can be lowered a desired amount within the operating limits of the adjusting mechanism and the suspensions to adapt the height of the trailer to the exigencies of the particular situation.

It is desirable to provide each suspension with a shock absorber 132 as shown in Fig. 6 to absorb sudden or heavy shocks applied to the wheel 14. In the drawing the shock absorber, which is conventional in construction and operation, is pivoted at one end to a bracket 134 on upwardly converging braces 136 and 138 mounted on and fastened to the wheel arm 20 adjacent the lower or trailing end thereof. The opposite end of the shock absorber is pivoted to a mounting bracket 140 on the upper end of the torsion arm 60.

Also it may be desirable to provide each suspension with a conventional rubber snubber column to control extreme movements of the wheel 14 under sudden heavy shock loads. A conventional snubber column 142 is shown in Fig. 6. The upper end of the column 142 is pivoted to the bracket 140 and the opposite end thereof is operatively associated with an extension 144 of the brace 136. As shown in the drawings, the column 142 is provided with the usual rubber bumpers 146 and 148 which are spaced apart to limit the travel of the wheel 14 under extreme shock loads.

What is claimed is:

1. A wheel suspension for trailers and the like comprising an axle, a wheel journaled for rotation on said axle, a wheel arm carrying said axle and extending radially therefrom beyond the periphery of said wheel, a fixed support, pivot means connecting the distal end of said arm to said support, a pair of spaced parallel rocker arms on said wheel arm rockable about said pivot means, a torsion rod fixed at one end to one of said rocker arms and turnably supported at the other end thereof by the other of said rocker arms, a torsion arm fixed to the last mentioned end of said torsion rod and extending radially therefrom, and adjustable means connected to the outer end of said torsion arm holding the same normally in a fixed predetermined position.

2. A vertically adjustable torsion wheel suspension for a vehicle having a frame and a wheel comprising a wheel arm carrying said wheel at one end and pivotally connected to said frame at the other end thereof, a pair of spaced parallel rocker arms on and pivotally movable with said wheel arm, a torsion rod fixed at one end to one of said rocker arms and turnably supported at the other end thereof by the other of said rocker arms, a torsion arm fixed to the last mentioned end of said torsion rod and extending radially therefrom, and means connected to the outer end of said torsion arm holding the same normally in a fixed predetermined position but adjustable to rock said torsion arm angularly to vary said predetermined position and the relative spacing between said frame and said wheel.

3. A vertically adjustable torsion wheel suspension for vehicles having a base frame and a wheel comprising a wheel arm below and generally parallel to one side of the frame carrying the wheel at one end and pivoted to the frame at the other end thereof, said wheel arm being rockable on its pivot to raise or lower said frame relative to said wheel, a pair of spaced parallel rocker arms connected to and rockable by said wheel arm, a torsion rod carried by said rocker arms fixed at one end to one of said rocker arms and turnably supported at the other end thereof by the other of said rocker arms, a torsion arm fixed to the last mentioned end of said torsion rod and extending radially therefrom, and means connected to the outer end of said torsion arm holding the same normally in a fixed predetermined position with said frame normally spaced a predetermined distance above said wheel but adjustable to rock the same angularly to vary said predetermined position.

4. A torsion suspension for a vehicle having a frame and a wheel, a wheel arm carrying said wheel and pivoted to said frame having a pair of spaced parallel rocker arms extending from the pivoted end thereof, a torsion rod carried by and connected at one end to one of said rocker arms having a radially extending torsion arm portion remote from said connected end, and means for adjusting said torsion arm portion angularly whereby to turn said torsion rod and move said frame vertically relative to said wheel.

5. A torsion suspension for a vehicle having a frame and a wheel, a wheel arm carrying said wheel and pivoted to said frame, said wheel arm being rockable on its pivot to vary the spacing between the frame and the wheel, a pair of pivoted mutually operable rocker arms connected to said wheel arm to rock in unison therewith, a torsion rod carried by said rocker arms and connected at one end to one of said rocker arms and having a radially extending torsion arm portion remote from said connected end, and means for adjusting said torsion arm portion angularly whereby to turn said torsion rod and move said frame vertically relative to said wheel.

References Cited in the file of this patent

UNITED STATES PATENTS

| | | |
|---|---|---|
| 2,080,969 | Macbeth | May 18, 1937 |
| 2,453,388 | Schramm | Nov. 9, 1948 |
| 2,587,624 | Johnson | Mar. 4, 1952 |
| 2,635,896 | Tantlinger | Apr. 21, 1953 |
| 2,681,811 | Green | June 22, 1954 |